US008777477B2

(12) United States Patent
Jackson

(10) Patent No.: US 8,777,477 B2
(45) Date of Patent: Jul. 15, 2014

(54) INFLATABLE CUSHION FOR ICE CREAM MAKER

(75) Inventor: Keith S. Jackson, Woodinville, WA (US)

(73) Assignee: Industrial Revolution, Inc., Tukwila, WA (US)

(*) Notice: Subject to any disclaimer, the term of this patent is extended or adjusted under 35 U.S.C. 154(b) by 98 days.

(21) Appl. No.: 13/028,189

(22) Filed: Feb. 15, 2011

(65) Prior Publication Data

US 2012/0207901 A1 Aug. 16, 2012

(51) Int. Cl.
*B01F 15/00* (2006.01)

(52) U.S. Cl.
USPC ............................ 366/130; 366/144; 206/522

(58) Field of Classification Search
USPC .......... 366/347, 130, 144, 147, 149; 426/519; 99/455; 62/457.1–457.9; 206/522
See application file for complete search history.

(56) References Cited

U.S. PATENT DOCUMENTS

| | | | | |
|---|---|---|---|---|
| 2,729,259 | A * | 1/1956 | Abrams | 215/12.1 |
| 4,172,365 | A * | 10/1979 | McClintock | 62/381 |
| 4,179,904 | A * | 12/1979 | McClenny | 62/342 |
| 4,809,352 | A | 2/1989 | Walker | |
| 5,131,665 | A * | 7/1992 | Myers | 473/600 |
| 5,251,908 | A * | 10/1993 | Myers | 473/607 |
| 5,255,533 | A * | 10/1993 | Reilly | 62/400 |
| 5,622,261 | A * | 4/1997 | Mobley et al. | 206/457 |
| 5,692,833 | A | 12/1997 | Deluca | |
| 5,857,351 | A * | 1/1999 | Angus et al. | 62/342 |
| 5,944,417 | A * | 8/1999 | Shiotani | 366/220 |
| D414,785 | S * | 10/1999 | Norris | D15/82 |
| 6,123,217 | A * | 9/2000 | Miller | 220/592.19 |
| 6,334,537 | B1 * | 1/2002 | Tepper | 206/522 |
| D514,602 | S * | 2/2006 | Draper | D15/82 |
| D661,936 | S * | 6/2012 | Jackson | D6/610 |
| 2007/0023439 | A1 | 2/2007 | Vaughn | |
| 2008/0308448 | A1 * | 12/2008 | Allen | 206/522 |
| 2009/0117236 | A1 * | 5/2009 | Watzke | 426/106 |
| 2009/0293532 | A1 * | 12/2009 | Najjar et al. | 62/457.7 |
| 2012/0207901 | A1 * | 8/2012 | Jackson | 426/519 |

FOREIGN PATENT DOCUMENTS

| | | | | |
|---|---|---|---|---|
| DE | 3624591 | A1 * | 1/1988 | |
| DE | 4123558 | C1 | 10/1992 | |
| EP | 383714 | A1 * | 8/1990 | A63B 45/00 |
| WO | 2007/076563 | A1 | 7/2007 | |

* cited by examiner

*Primary Examiner* — Charles E Cooley
(74) *Attorney, Agent, or Firm* — DWC Law Firm, P.S.; David Chen

(57) ABSTRACT

An inflatable cushion useable for an ice cream maker. The ice cream maker can be spherical in shape and the inflatable cushion can approximate a spherical or dodecahedron shell. The inflatable cushion can be comprised of two half-shell portions that are pivotable with respect to one other to be selectively placed in a closed or open position. The ice cream maker can be snugly inserted within the inflatable cushion.

3 Claims, 7 Drawing Sheets

INFLATABLE CUSHION FOR ICE CREAM MAKER

BACKGROUND

1. Field of the Invention

The present invention relates generally to an inflatable cushion, and in particular, an inflatable spherical-shell shaped or dodecahedron-shell shaped cushion, which can be configured for receiving an ice cream maker.

2. Description of Related Art

U.S. Pat. No. 5,857,351, which is incorporated herein by reference in its entirety, discloses an ice cream maker having an inner container with a lid, the inner container being insertable within an outer container, wherein the outer container is encased in a spherical jacket. Ingredients for a frozen dessert may be inserted into the inner container and a mixture of rock salt and ice is insertable in a space between the inner and outer containers. Another lid, formed integrally with the jacket, seals the ice and rock salt in position.

In some embodiments, in practice, the outer spherical jacket serves as the second container. The spherical jacket can be made of translucent plastic and formed with spaced apart ribs. U.S. Pat. No. D514602, which is incorporated herein by reference in its entirety, shows an example of such plastic spherical jacket. The inner container is disposed within the spherical jacket, and ingredients for ice cream can be placed in the inner container. A mouth of the inner container is connected to the wall of the spherical jacket, so that the inner container can be accessed through the spherical jacket. A removable lid for the inner container can be disposed on a surface of the spherical jacket for use in sealing the mouth of the inner container. A second removable lid can be positioned at a different position on the spherical jacket for use in accessing the interior of the spherical jacket, in order to place the mixture of rock salt and ice therein for contact with the outer wall of the inner container. After the ice cream ingredients and ice mixture are provided to the ice cream maker, the lids can be sealed, and users can roll, or shake the spherical jacket during play to agitate the mixtures, in order to form ice cream. Thereafter, the lid for the inner container can be removed to access the ice cream.

BRIEF SUMMARY OF THE INVENTION

Some embodiments of the present invention comprise an ice cream maker assembly. The assembly can include a spherical-shell shaped (or dodecahedron shaped) inflatable cushion and a spherically shaped ice cream maker. The inflatable cushion can be configured of twelve (12) pentagonal sections forming faces of the inflatable cushion. Each of the pentagonal sections can have edge portions that are welded together. The inflatable cushion has a first half-shell portion and a second half-shell portion, with the two half-shell portions being pivotable about a connection rim portion for selectively opening or closing the half-shell portions so that a user can snugly fit the spherically shaped ice cream maker within the inflatable cushion. Various embodiments of the inflatable cushion and methods of using the ice cream maker with the inflatable cushion are also provided.

BRIEF DESCRIPTION OF THE DRAWINGS

FIG. 6 is a top view of the reverse side of the inflatable cushion in FIG. 3, with the half-shell portions placed in an open position and deflated.

DETAILED DESCRIPTION OF PREFERRED EMBODIMENTS

In the following description, certain specific details are set forth in order to provide a thorough understanding of various embodiments of the invention. However, upon reviewing this disclosure, one skilled in the art will understand that the invention may be practiced without many of these details. In other instances, some well-known materials of construction, structures and methods associated with inflatable devices have not been described in detail to avoid unnecessarily obscuring the descriptions of the embodiments of the invention.

Figure 1:
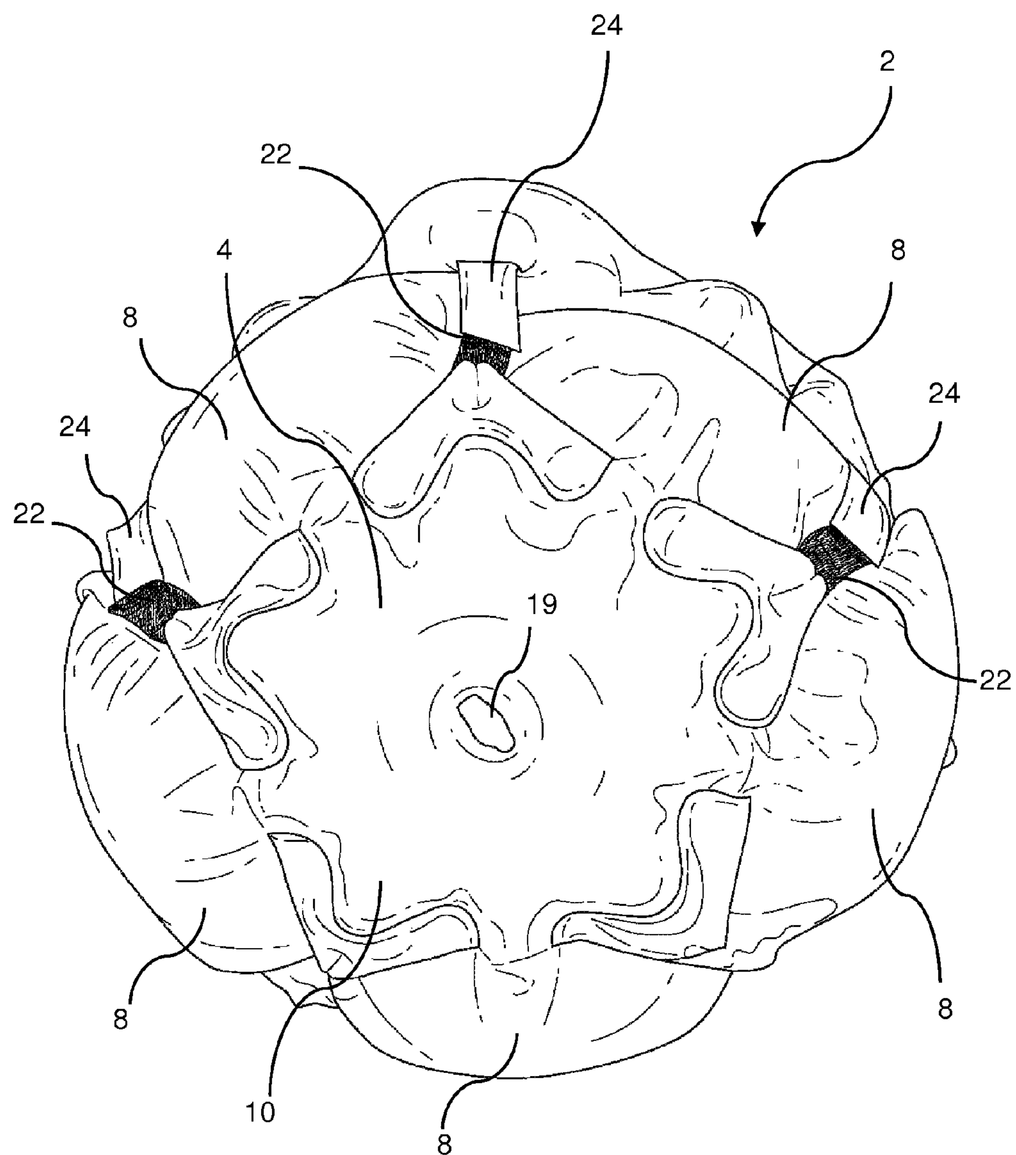
FIG. 1 is a first side perspective view of an embodiment of the inflatable cushion of the present invention.
Figure 2:
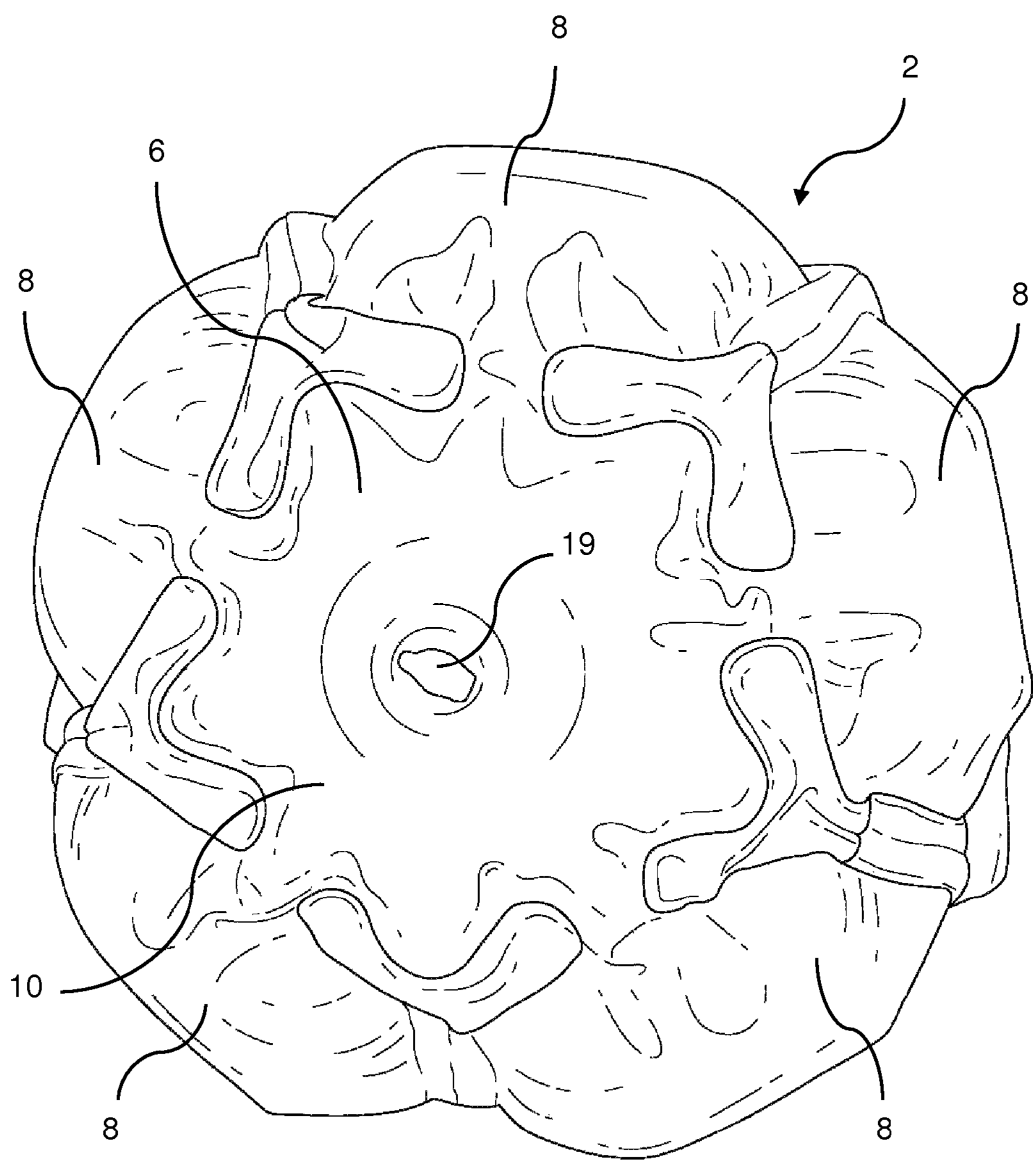
FIG. 2 is a second side perspective view of the inflatable cushion of FIG. 1.
Figure 3:
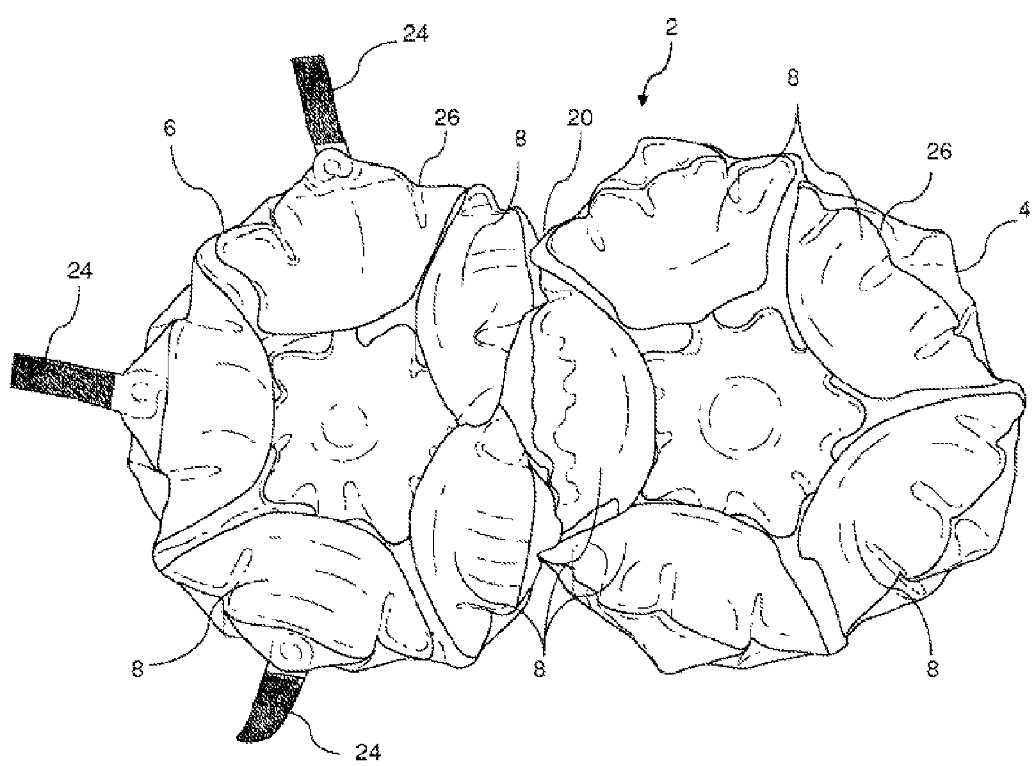
FIG. 3 is top plan view of the inflatable cushion of FIG. 1 with the inflatable cushion placed in an open position.

FIGS. 1, 2 & 3 show an embodiment of a generally spherical-shell shaped inflatable cushion 2 of the present invention, in inflated form. The inflatable cushion 2 can have an inflatable first half-shell portion 4 connected to an inflatable second half-shell portion 6. Valves with valve lids 19 are provided on a central section 10 of each of the half-shell portions 4, 6. Each of the half-shell portions 4, 6 can be configured such that when it is inflated it approximates a half of a spherical-shaped shell.

Referring to FIG. 3, the half-shell portions 4, 6 are separate portions that can be connected together along respective rim portions 20, the rim portions 20 extending about a quarter of the perimeter (or circumference) of each rim 26 of the half-shell portions 4, 6. This allows the inflated half-shell portions 4, 6 to be easily laid open as shown in FIG. 3, and to be easily rotated about the rim portions 20 to close the half-shell portions 4, 6 into a spherical shell as shown in FIGS. 1 & 2.

Figure 5:
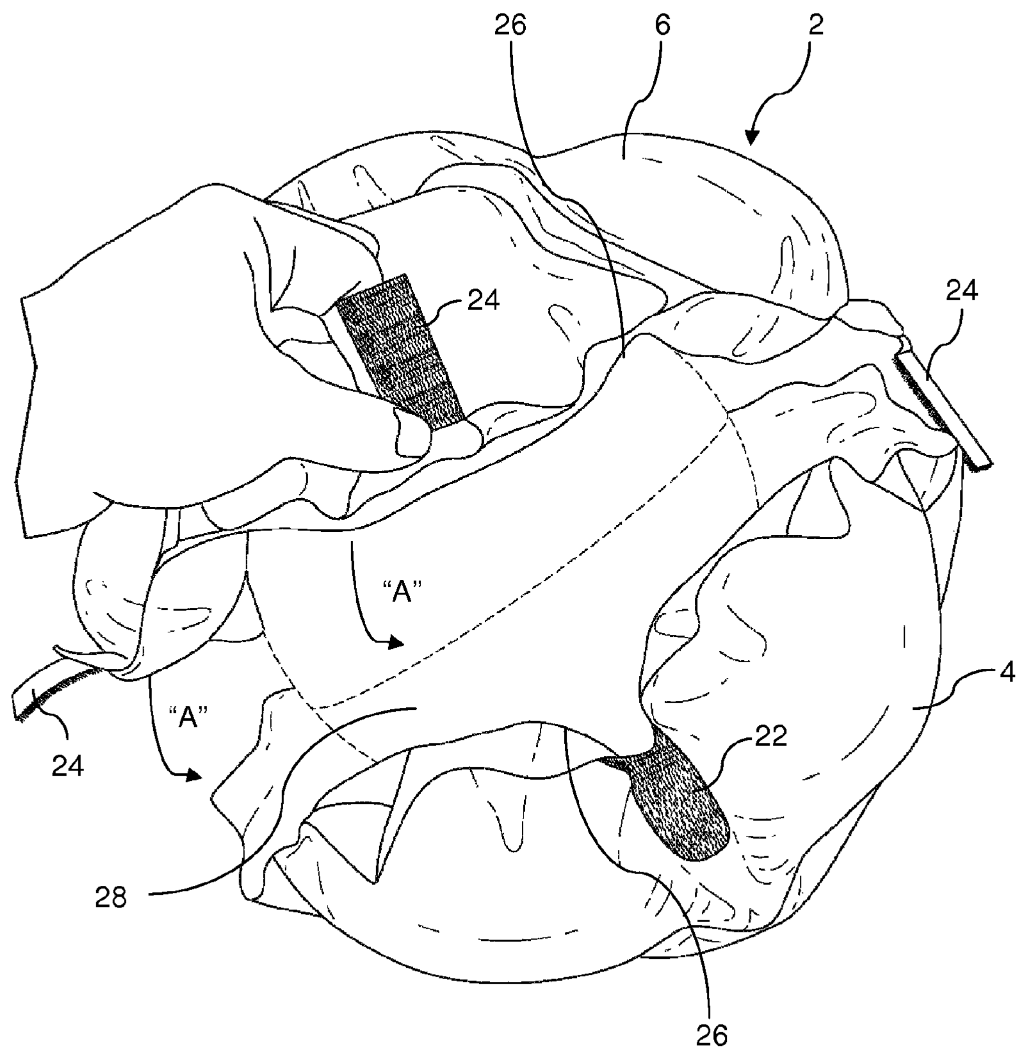
FIG. 5 is a perspective view of the inflatable cushion of FIG. 4, showing the second half-shell portion of the inflatable cushion having been folded over the spherical ice cream maker to fit snugly over the ice cream maker.

Each of the half-shell portions 4, 6 can have multiple attachment members 22, 24. In some embodiments, the attachment members can be hook & loop fasteners (e.g., VELCRO™). For example, referring to FIGS. 1 & 5, the first half-shell portion 4 can have multiple surface attachment strips 22 attached on an outside of the half-shell portion 4 near a rim 26 thereof. Referring to FIGS. 3 & 5, the second half-shell portion 6 can have corresponding attachment straps 24 attached to an outside surface of the second half-shell portion 6 near a rim 26 thereof. The attachment straps 24 can be flexible and elongated, and can extend away from the rim 26 of the second half-shell portion 6 so that they can be aligned with corresponding surface attachment strips 22 of the first half-shell portion 4, as shown in FIG. 1. In this manner, the attachment straps 24 can mate with the attachment strips 22 to secure the half-shell portions together.

Figure 4:
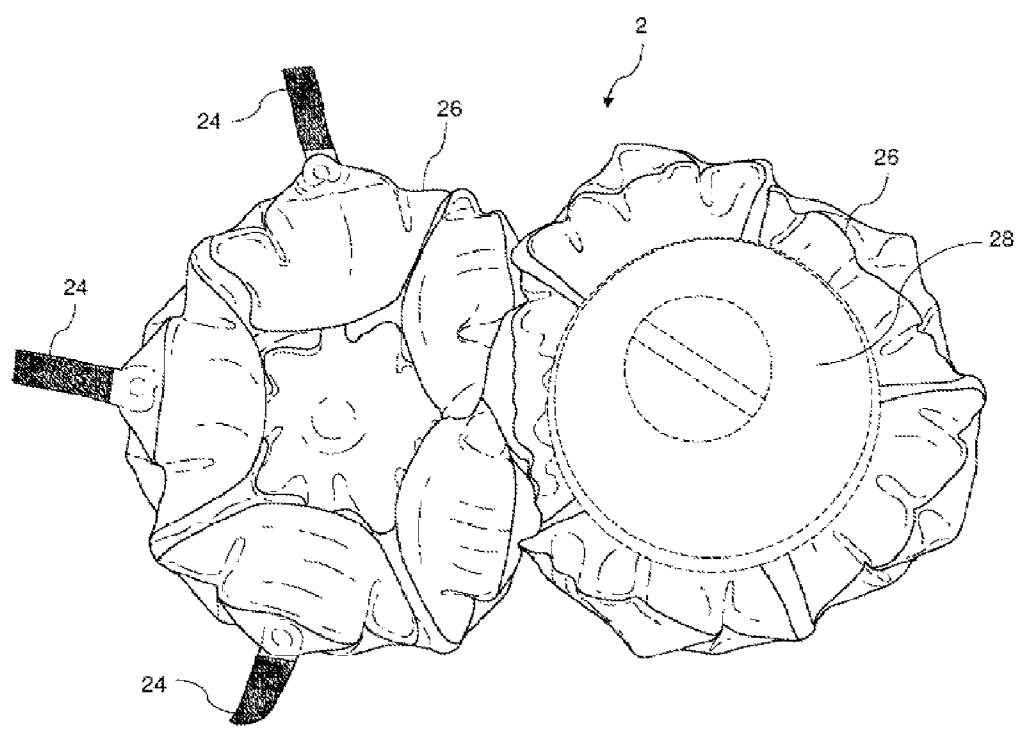
FIG. 4 is the top plan view of FIG. 3, showing a spherical ice cream maker placed snugly within a first half-shell portion of the inflatable cushion.
Figure 6:
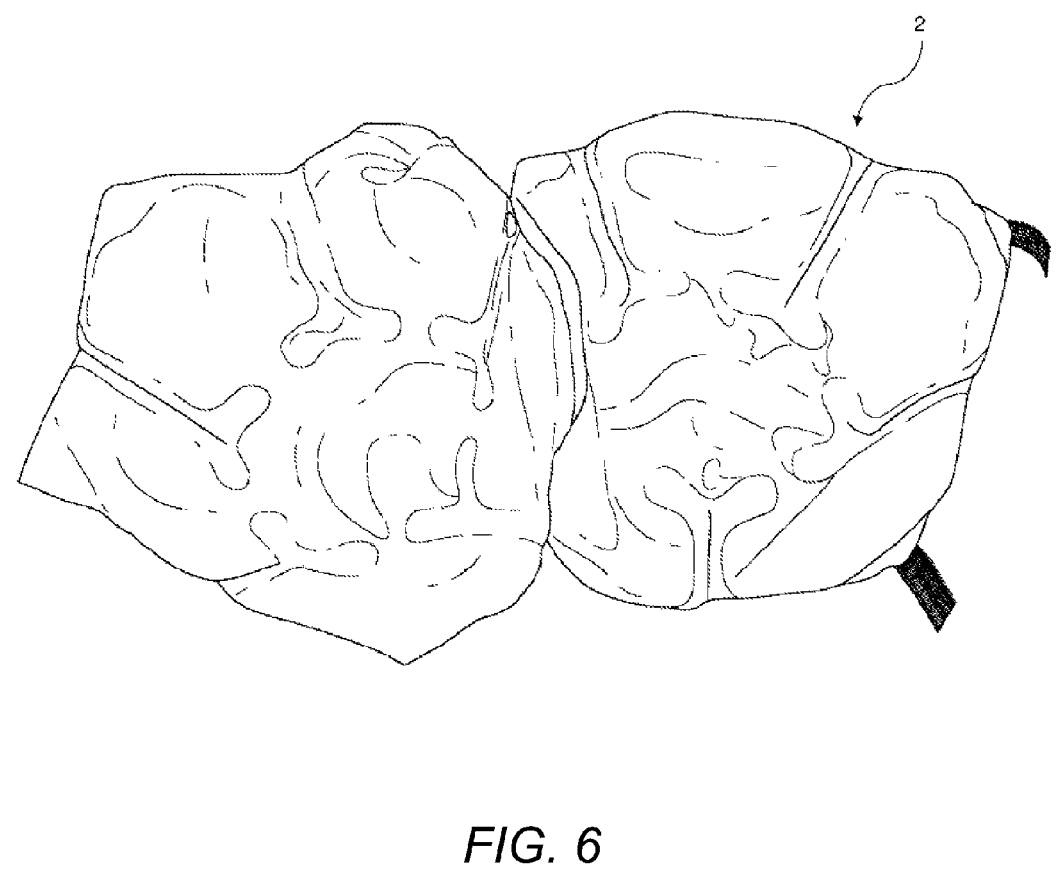

As can be seen in FIG. 4, a spherical ice cream maker 28, such as that described in the BACKGROUND, supra, having a plastic ribbed spherical jacket, is shown placed within the first half-shell portion 4. The spherical ice cream maker 28 can fit snugly within the first half-shell portion 4 when it is inflated. A user can then pivot the second half-shell portion 6 about its rim portion 20 in the direction of arrows “A,” as shown in FIG. 5, to cover the spherical ice cream maker 28, and can pull the attachment straps 24 tight against corresponding surface attachment strips 22. The two half-shell portions 4, 6 can thus be selectively secured in a closed position in order to encase the spherical ice cream maker 28 inside the inflatable cushion 2, as shown in FIGS. 1 & 2. If the ice cream maker has been filled with ingredients and ice, users can then roll, push or shake the inflatable cushion to agitate the ice cream maker 28. The inflatable cushion can help lower risk of injury to users that might be caused by impacts of the ice cream maker against their limbs or bodies, provided that the inflatable cushion and ice cream maker are used properly in accordance with accompanying instructions. The inflatable cushion can also provide additional insulation for the ice cream maker to help maintain low temperatures inside the ice cream maker when making ice cream. When the inflatable cushion is not in use, it can be deflated for storage, such as shown in FIG. 6.

Figure 7:
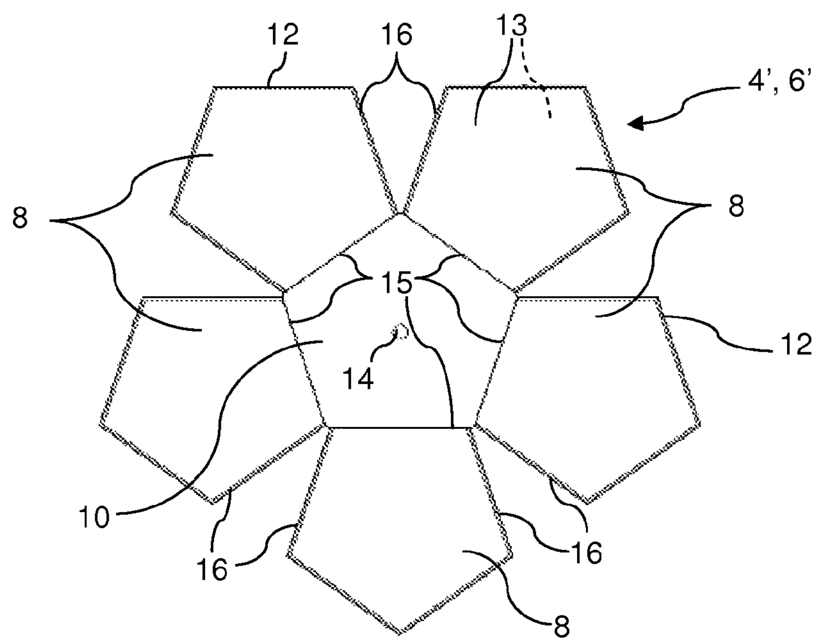
FIG. 7 is a plan view of a welded piece from which a half-shell portion is formed for the inflatable cushion of FIG. 3.

In some embodiments, each of the half-shell portions 4, 6 is formed from a flexible welded piece 4', 6'. Referring to FIG. 7, each welded piece 4', 6' comprises five, similarly shaped, outer inflatable sections 8, which are all individually connected to a central inflatable section 10, which can also be similarly shaped. All of the inflatable sections 8, 10 can be pentagonal in perimeter shape. The welded pieces 4', 6' can each be formed of two precut sheets 13 having mirror image profiles, that can be aligned together and sealed or welded together along edges 12 to form a single welded piece 4', 6', as shown in FIG. 7 (only one side of the welded piece is shown). This configuration can provide an inflatable space between the sheets 13 of the welded piece 4', 6'. A valve opening 14 is provided on the central section 10 of one of the sheets of each welded piece 4', 6', for use in inflating the half-shell portion 4, 6. Pressurized air that enters the valve opening 14 can pressurize each of the outer sections 8, as well as the central section 10. The sheets 13 can be comprised of, for example, without limitation, polyvinyl chloride (or another type of flexible plastic).

Figure 8:
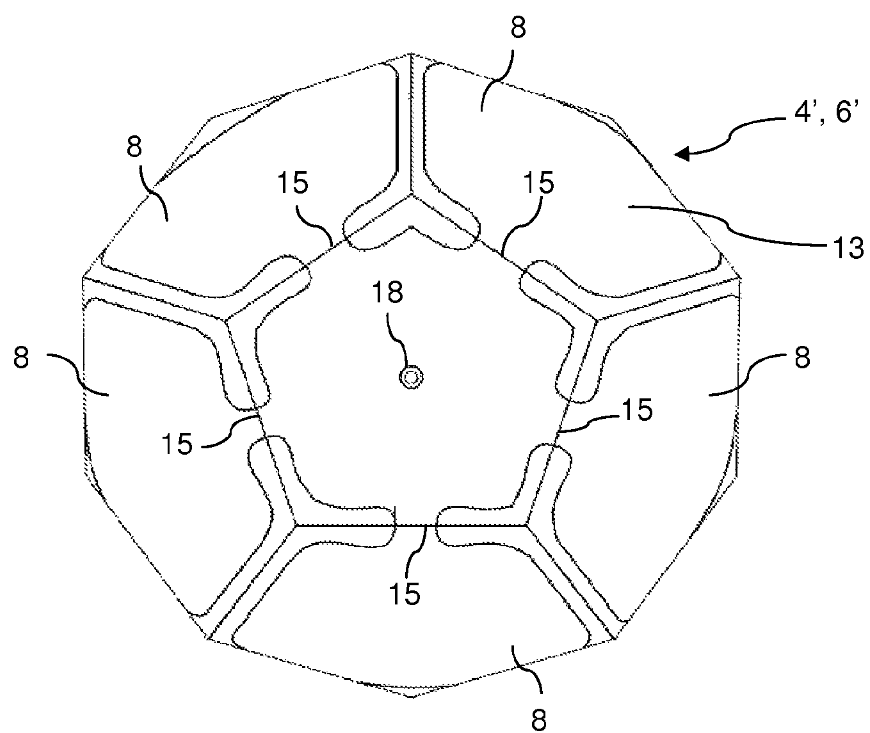
FIG. 8 is a simplified top view of the welded piece of FIG. 7, with the edges of the gaps having been connected by welding.

As can be seen in FIGS. 7 & 8, the outer sections 8 of the welded piece 4', 6', can each be folded inward toward the central section 10 (e.g., inward toward the page in FIG. 7), about corresponding edges 15 of the central inflatable section 10, to bring the edges 12 of the gaps 16 (the gaps 16 between the outer sections 8) together so that the edges 12 of the gaps 16 can be aligned and attached. In this manner, half-shell portions 4, 6 for a generally spherically-shaped shell can be formed. As best seen in FIGS. 1 & 2, there is a valve 18 on the outside of each of the half-shell portions 4, 6 connected to the valve opening 14, having a valve cap 19, the valve cap being easily opened to allow connection to a pressurized air source for inflating the half-shell portions, or for manually blowing-up the half-shell portions 4, 6.

Although specific embodiments and examples of the invention have been described supra (and in the attachments) for illustrative purposes, various equivalent modifications can be made without departing from the spirit and scope of the invention, as will be recognized by those skilled in the relevant art after reviewing the present disclosure. The various embodiments described can be combined to provide further embodiments. The described structures and methods can omit some elements or acts, can add other elements or acts, or can combine the elements or execute the acts in a different order than that illustrated, to achieve various advantages of the invention. These and other changes can be made to the invention in light of the detailed description.

In general, in the following claims, the terms used should not be construed to limit the invention to the specific embodiments disclosed in the specification. Accordingly, the invention is not limited by the disclosure, but instead its scope is determined entirely by the following claims.

What is claimed is:

1. An ice cream maker assembly comprising:

an inflatable cushion;

a spherically shaped ice cream maker with a spherical jacket snugly disposed within the inflatable cushion; and wherein the inflatable cushion is dodecahedron in shape with a plurality of pentagonal sections, and wherein the pentagonal sections are formed from flexible welded pieces, wherein each welded piece comprises five outer inflatable pentagonal sections attached to a central pentagonal section, and each welded piece is formed from two precut sheets having mirror image profiles that are aligned together and sealed together along edges of the precut sheets to form a single welded piece with an inflatable space between the sheets, and wherein each of the five outer inflatable pentagonal sections and central pentagonal section can be inflated through a valve on one of the pentagonal sections.

2. The ice cream maker assembly of claim 1 wherein the inflatable cushion comprises a first half portion and a second half portion, with the two half portions being pivotable about a connection rim portion for selectively opening or closing the half portions.

3. The ice cream maker assembly of claim 2 further comprising attachment members attached proximate the rims of each of the first half portion and second half portion.

* * * * *